United States Patent [19]

Lorenz

[11] 4,451,183
[45] May 29, 1984

[54] METHOD AND ARRANGEMENT OF TRANSPORTING AGGREGATE, FRAGMENTED MATERIAL AND THE LIKE

[75] Inventor: Howard I. Lorenz, Houston, Tex.

[73] Assignee: Pool Company, Houston, Tex.

[21] Appl. No.: 250,409

[22] Filed: Apr. 2, 1981

[51] Int. Cl.³ .................... B65G 53/00; B65G 53/30
[52] U.S. Cl. ................................. 406/94; 406/197
[58] Field of Search .......................... 406/197, 93–95

[56] References Cited

U.S. PATENT DOCUMENTS

| | | | |
|---|---|---|---|
| 1,385,447 | 7/1921 | Hamilton | 406/197 |
| 2,897,005 | 7/1959 | Wiltse | 406/95 |
| 3,073,652 | 1/1963 | Reichl | 406/197 X |
| 3,180,691 | 4/1965 | Wunsch et al. | 406/197 |
| 3,206,256 | 9/1965 | Scott | 406/197 |
| 3,544,170 | 12/1970 | Bowles | 406/93 |
| 3,754,561 | 8/1973 | Sharman et al. | 406/197 X |
| 3,937,283 | 2/1976 | Blauer et al. | 406/197 X |
| 3,980,136 | 9/1976 | Plummer et al. | 406/197 X |

Primary Examiner—John J. Love
Assistant Examiner—L. E. Williams
Attorney, Agent, or Firm—Jack W. Hayden

[57] ABSTRACT

Aggregate, fragmented material and the like is transported in a pipeline by introducing foam under pressure into the pipeline along with the aggregate, fragmented material and the like to be transported and the foam and aggregate, fragmented material and the like are maintained at a pressure to move the aggregate, fragmented material and the like and foam along the pipeline. The foam may be regenerated at spaced positions along the pipeline by introducing additional foam into the pipeline or introducing gas under pressure into the pipeline to agitate the foam. The gas phase of the foam, as well as the gas employed to regenerate the foam consists essentially of one of the group consisting of air, nitrogen, natural gas or carbon dioxide and the liquid phase of the foam consists essentially of one of the group consisting of water, brine or oil.

The aggregate may be mixed with a liquid to provide a slurry and then introduced into the pipeline under pressure and pumped therealong, with foam introduced under pressure into the pipeline at spaced positions therealong. In some instances, the pipeline will be provided with generally upwardly or vertically extending portions wherein the lower end of such section communicates with the upstream portion of the pipeline and the upper end of the section communicates with the downstream portion of the pipeline and additional foam is injected into the generally upwardly extending section adjacent the lower end thereof, as well as at spaced intervals therealong, if necessary, to assist in moving the aggregate through the pipeline.

2 Claims, 4 Drawing Figures

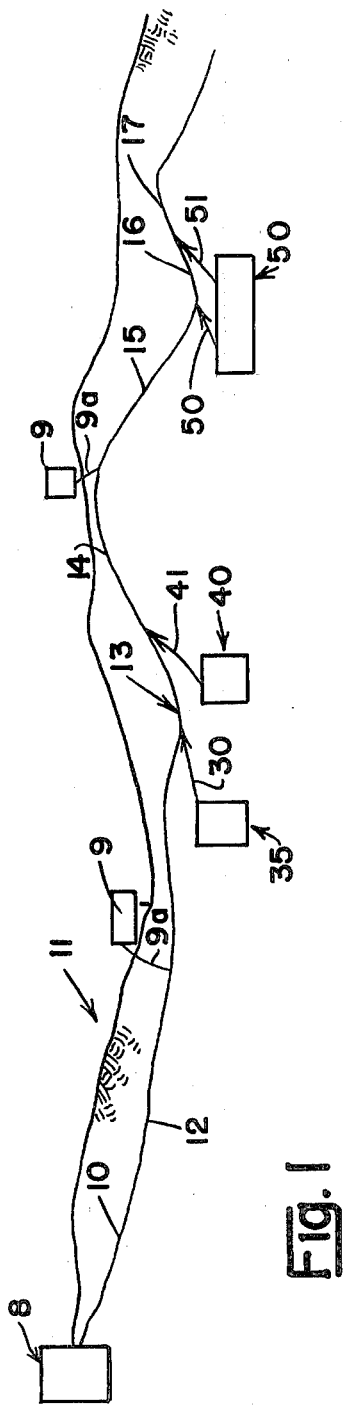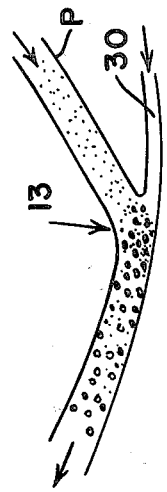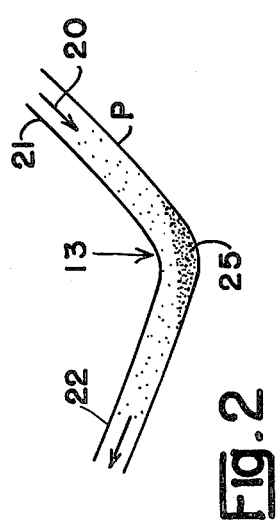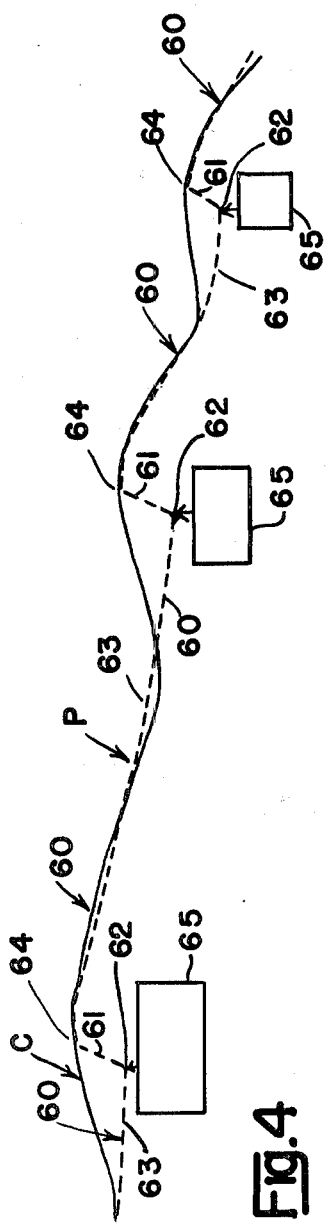

METHOD AND ARRANGEMENT OF TRANSPORTING AGGREGATE, FRAGMENTED MATERIAL AND THE LIKE

SUMMARY OF THE INVENTION

Various types of foam have been used and are well known in connection with the drilling and production of oil and gas wells. Similarly, the proposal to transport aggregates such as coal and the like by slurries in pipelines has been proposed.

However, substantial opposition and objection to the use of slurry pipelines for transporting coal and the like has arisen due to the substantial quantities of water which may be employed in such situation.

Also, some difficulty has been encountered in that some low spots in the pipeline may cause the fines of the aggregate to settle out over a period of time to such an extent that substantial clogging and other dilatorious affects are encountered in the attempted use of slurry pipelines.

A primary object of the present invention is to provide a method and arrangement for transporting aggregates in a pipeline without employing a liquid phase as a component.

Still another object of the present invention is to reduce the amount of water or liquid required for a slurry aggregate pipeline by introducing at spaced intervals therealong a foam to assist in continued movement of the aggregate, as well as inhibiting the settling out of any of the aggregate in the pipeline.

Still a further object of the present invention is to provide a pipeline arrangement which includes vertically or upwardly extending sections at spaced intervals along the pipeline with the lowermost end of such section communicating with the upstream portion of the pipeline and the upper end of such upwardly or generally vertically extending section communicating with the next adjacent section of pipeline, with foam being introduced adjacent the lowermost end of such upwardly extending section of the pipeline, as well as at spaced intervals along the portion of upwardly extending pipeline section as required to assist in continued movement of the aggregate in the pipeline and through the next adjacent section communicating with the upwardly extending section at its upper end.

A further object of the present invention is to provide a method and arrangement for transporting the aggregate in a pipeline wherein the liquid phase, if liquid be employed with the aggregate to form a slurry, may be recovered for reuse.

A further object of the present invention is to provide a method and arrangement for transporting the aggregate in a pipeline wherein the liquid phase, if liquid be employed with the aggregate to form a slurry, may be recovered for reuse, and wherein the liquid phase of the slurry consists of water, brine or oil.

A method of transporting solid aggregate in a pipeline along with foam as the carrier for the aggregate, wherein the gas phase of the foam consists essentially of one of the group consisting of air, nitrogen, natural gas or carbon dioxide and the liquid phase of the foam consists essentially of one of the group consisting of water, brine or oil.

Other objects and advantages of the present invention will become apparent from a consideration of the following drawings and description.

BRIEF DESCRIPTION OF THE DRAWINGS

FIG. 1 is a schematic representation of a pipeline illustrating one form of the present invention;

FIG. 2 is an enlarged view of a portion of the pipeline of FIG. 1 illustrating solids settled out in such pipeline;

FIG. 3 is a view similar to FIG. 2 and illustrating a form of the present invention employed to assist in moving aggregate through a pipeline and eliminate or reduce the settling of aggregate fines in the pipeline; and FIG. 4 is a diagrammatic view illustrating an arrangement of a pipeline and a method of transporting aggregate through such pipeline.

DESCRIPTION OF THE PREFERRED EMBODIMENTS

In FIG. 1 a pipeline is represented generally by the numeral 10 and is shown as following the general contour of the earth's surface as represented at 11. Thus, the pipeline 10 will have portions as represented at 12 which generally descend as illustrated and reach a lowermost point or elevation as represented at 13. In some instances, the contour of the earth's surface will be such that the next adjacent portion 14 will extend upwardly, with the next adjacent portion 15 extending downwardly to provide yet another lowermost portion as represented at 16. Thus, the pipeline 10, while extending thousands of miles may have a plurality of generally downwardly extending portions as represented at 12 and 15 with a plurality of lowermost spaced portions 13 and 16 as represented in FIG. 1, which are separated by the upwardly extending portions 14 and 17.

It has been found that at the lowermost point such as represented at 13 and 16 of FIG. 1 of the drawings, that the fines of a solid aggregate will tend to settle out when a slurry is moved through the pipeline such as represented at 10 in FIG. 1.

For example, as shown in enlarged detail in FIG. 2, the lowermost portion 13 is again illustrated with the pipeline being represented by the letter P. The direction of movement of the liquid slurry is indicated by the arrow 20 on the inclined portion 21 of the pipeline P, such inclined portion being inclined or extending downwardly as represented in FIG. 2. The lowermost portion referred to generally at 13 between the downwardly inclined portion 21 and the next adjacent upwardly extending portion 22 of the pipeline P may provide an accumulation zone in which the fines of a liquid slurry collect, such collection of fines being represented by the numeral 25.

In order to inhibit the accumulation of fines represented at 25 in FIG. 2, foam may be injected through a suitable conduit 30 that communicates with the pipeline P adjacent the lowermost portion 13 thereof as illustrated in FIG. 3. The foam may be of any suitable and well known type, such as disclosed in U.S. Pat. No. 3,463,231. The foam consists of a gas phase and a liquid phase and provides a component of suitable and proper viscosity for not only agitation of the collection of fines as represented at 25 in FIG. 2, but will actually pick them up, or convey and transport them in the foam along the pipeline P. It can be appreciated that the foam is injected into the conduit 30 and pipeline P at a pressure sufficient to accomplish the desired agitation and removal of the collection of fines as represented at 25 in FIG. 2, and to also carry or move them along the pipeline P. This arrangement is referred to generally by the numeral 35 in FIG. 1 wherein a foam generation or foam introduction station is illustrated and is communicated to the low area or portion 13 of the pipeline, there indicated by the numeral 10, by the conduit 30.

In some instances, it will be desirable to provide one or more additional foam generating stations referred to by the numeral 40, which are communicated by suitable means such as a conduit 41 to the upwardly extending or upwardly inclined portion 14 of the pipeline to further assist in maintaining the fines either in the liquid slurry or in the foam phase introduced into such portion of the pipeline to inhibit their settling out and falling back down the upwardly inclined portion, as represented at 14, of the pipeline.

As can be seen in FIG. 1, the foam generation stations may be provided at each lowermost point along the pipeline there represented by the numeral 10, as represented generally by the numerals, 35, 40 and 50. If desired, each foam generation station or injection position may be provided with one or more conduits which connect with the pipeline 10 to communicate foam thereinto to assist in inhibiting the formation of a collection of fines 25, as illustrated in FIG. 2, and to assist in moving the fines and other aggregate along the pipeline including the next adjacently upwardly extending incline without settling thereof and without falling back down to a collection point adjacent the lowermost section of the pipeline.

As previously noted, substantial opposition to slurry aggregate pipelines has arisen due to the alleged shortage of water in some portions of the United States where there is a quantity of coal deposits. The present invention contemplates an arrangement for transporting solid aggregate in a pipeline without employing a liquid slurry, wherein a liquid forms the primary carrying medium for the aggregate in the slurry. This is accomplished by substituting foam for the liquid and introducing foam under pressure into the pipeline 10 at the point of origination as represented by the numeral 8 in FIG. 1. The pressure of the foam and aggregate carried thereby is maintained at a sufficient level to move the aggregate along the pipeline. If desired, the foam may be regenerated by adding additional foam at spaced intervals along the pipeline as represented at 35, 40 and 50 in FIG. 1, or if desired, the positions 35, 40 and 50 of FIG 1 may also incorporate regeneration equipment other than foam generators for introducing into the pipeline 10 at spaced intervals therealong. For example, the foam may be reconstituted, regenerated or rehabilitated by agitation with a gas. If the addition of gas into the pipeline will not act to reconstitute or rehabilitate the foam in a manner as desired, then additional foam may also be introduced into the pipeline at desired spaced intervals therealong to maintain the constituency of the foam at the desired viscosity.

It can be appreciated that under these circumstances the injection of air into the pipeline 10 at spaced intervals may be accomplished at intervals other than the lowermost point or points of the pipeline 10 as represented at 13 and 16 and as described in detail with regard to FIGS. 2 and 3. For example, regeneration points as illustrated at 9 may be positioned along the pipeline at any suitable spaced interval with the conduit 9a serving to communicate to the pipeline gas under pressure to reconstitute or rehabilitate the foam carrier for the aggregate conducted in the pipeline.

In some instances, it will be desirable to employ both the regeneration points or stations 9 along the pipeline 10, as well as the foam generation or foam injecting positions as represented at 35, 40 and 50 at the lowermost points of the pipeline as previously described.

The gas phase of the foam employed as the carrier medium for the aggregate in the present invention consists essentially of one of the group consisting of air, nitrogen, natural gas or carbon dioxide, while the liquid phase of the foam preferably consists of one of the group consisting of water, brine or oil. The ratio or type of gas and liquid phase of the foam is such that a highly combustible combination is avoided.

Where foam is employed as the carrier for the aggregate in a pipeline as described hereinabove, one of the objections of transporting coal or other aggregates by pipeline is overcome, namely the tremendous amount of water allegedly necessary to carry the aggregate. Further, the foam has advantages as the carrier medium in that it is more viscous than water and larger size aggregate may be retained therein as it moves through the pipeline without settling.

FIG. 4 illustrates yet another embodiment of the present invention wherein a pipeline is referred to generally by the letter P. The terrain or contour of the earth is represented by the solid line designated C. In this embodiment of the present invention, the pipeline is constructed so that is consists of a plurality of tubular members connected in end-to-end relation which form the pipeline sections referred to generally by the numeral 60. The pipeline sections 60 are joined by the pipeline section represented at 61. The pipeline section 61 is constructed so that it extends upwardly and vertically, or vertically preferably at least in one plane so that its lower end 62 communicates with the upstream portion of the pipeline represented at 63 while its upper end 64 communicates with the next adjacent portion 60 of the pipeline P which is downstream of the section 61. It will be noted that a plurality of such upwardly, or preferably generally vertically extending portions 61 are provided at spaced intervals along the pipeline between the sections represented by the numeral 60.

Adjacent the lowermost end 62 of the sections 61 which extend upwardly between the sections 60, a foam injection or foam generation point or station 65 is provided for injecting or introducing foam into the pipeline. If desired, additional foam introduction stations may be provided between the lowermost end 62 and upper end 64 of each of the sections 61 to accomplish the desired results. The introduction of foam at these points assists in regenerating the foam in the pipeline P and further assists in maintaining the aggregate carried by such foam within the foam and inhibit falling back of such aggregate toward the lowermost end 62 and assist in properly carrying the aggregate through the next adjacent portion 60 of the pipeline P.

The arrangement illustrated in FIG. 4 has particular advantages where foam is employed as the carrier medium for aggregate in pipelines; however, it can be appreciated that this arrangement may also be employed where liquid is employed as the primary carrier medium for the aggregate in the pipeline.

As previously noted, where foam is employed as the carrier medium for aggregate in a pipeline, the amount of water employed in the foam is immaterial relative to the quantities of water heretofore thought necessary to form a slurry aggregate for movement along a pipeline from one location to another. Further, the viscosity of the foam is greater than that of water and it displays greater carrying capacity than liquid such as water.

In addition, the amount of energy or power required to transport aggregate, such as coal, through a pipeline by employing foam as in the present invention is substantially reduced. Similarly, if foam is employed as an assist to move liquid slurries in a pipeline, the amount of energy is substantially reduced. Where foam is used either as the carrier medium or is used as an additional medium to be injected or introduced into the pipeline P at spaced points where liquid is the primary carrier for the aggregate, it is believed that the size of aggregate conveyed through the pipeline may be larger than that heretofore contemplated.

In those instances where the liquid component in a slurry system is valuable and/or scarce, it may be employed as the carrier and the introduction of foam will not debilitate it to the point that it cannot be recovered and reused as desired for additional slurry mixes, or for additional and further industrial needs.

It is to be understood that the injection of foam at spaced intervals along the pipeline 10, as well as the injection of air to rehabilitate the foam may be employed where liquid is employed to form an aggregate slurry, or where foam is the primary conveying medium for the aggregate in the pipeline.

Similarly, the pipeline P arrangement of FIG. 4 may be employed where liquid is the primary conveying means for the aggregate and the injection of foam to assist movement along the pipeline, including portions 61, as is described with regard to FIG. 4.

The term "solid aggregate" refers to particles or fragments of various size of solids such as coal. While the invention has been described particularly in relation to transporting coal, this is by way of example only as any solid and any suitable liquid which will form a slurry therewith may be transported by means of the present invention.

Similarly, any solid may be fragmented and transported by foam under pressure as disclosed herein.

The foam generation stations and the foam rehabilitation stations are of any suitable type such as those disclosed in various patents relating to the use of foam in oil and gas wells.

Also, the ratio of foam agent to water or other liquid to air is subject to variation due to the difference in the composition of different slurries and different conditions, such as temperature, pressure, velocity and the like. The foaming agent may be one of many formulations and is to be selected or compounded to maintain the maximum foam, i.e., life in the presence of the components, which may be present in the pipeline such as hydrocarbon gas, or liquid, sulphur, calcium, carbonates or other constituents.

What is claimed is:

1. A method of transporting aggregate, fragmented material and the like in a pipeline comprising the steps of:
   a. introducing foam under pressure into the pipeline along with aggregate, fragmented material and the like;
   b. maintaining the foam at a pressure to move the aggregate, fragmented material and the like through the pipeline;
   c. providing an upwardly extending section of pipeline at spaced intervals therealong, which upwardly extending section communicates at its lower end with the upstream portion of the pipeline, the upper end of such upwardly extending section being elevated relative to the lower end and communicating with the downstream portion of the pipeline; and
   d. introducing gas under pressure into the pipeline adjacent the lower end of the upwardly extending section to regenerate the foam and assist in moving the foam and aggregate, fragmented material and the like through the pipeline.

2. A method of transporting aggregate, fragmented material and the like in a pipeline comprising the steps of:
   a. introducing foam under pressure into the pipeline along with aggregate, fragmented material and the like;
   b. maintaining the foam at a pressure to move the aggregate, fragmented material and the like along the pipeline;
   c. providing an upwardly extending section of pipeline at spaced intervals therealong, which upwardly extending section communicates at its lower end with the upstream portion of the pipeline the upper end of such upwardly extending section being elevated relative to the lower end and communicating with the downstream portion of the pipeline; and
   d. introducing additional foam under pressure into the pipeline adjacent the lower end of the upwardly extending section to assist in continued movement of the aggregate, fragmented material and the like through the pipeline.

* * * * *